United States Patent [19]

Cassidy et al.

[11] 3,966,482

[45] June 29, 1976

[54] REFRACTORY BINDER

[75] Inventors: John Edward Cassidy; Philip Glenn Millar, both of Runcorn, England

[73] Assignee: Imperial Chemical Industries Limited, London, England

[22] Filed: Sept. 19, 1974

[21] Appl. No.: 507,606

[30] Foreign Application Priority Data

Sept. 28, 1973 United Kingdom............... 45432/73

[52] U.S. Cl................................ 106/64; 106/65; 106/85; 106/104
[51] Int. Cl.².......................................... C04B 35/02
[58] Field of Search .................. 106/64, 65, 85, 104

[56] References Cited
UNITED STATES PATENTS

| 3,360,594 | 12/1967 | Criss ...................................... 106/64 |
| 3,522,063 | 7/1970 | Treffner et al......................... 106/64 |
| 3,804,648 | 4/1974 | Birchall et al. ........................ 106/85 |

*Primary Examiner*—J. Poer
*Attorney, Agent, or Firm*—Cushman, Darby & Cushman

[57] ABSTRACT

A binder suitable for use in the binding of non-basic refractory aggregate, for example, magnesia, and comprising a mixture of a calcium aluminate and a water soluble aluminium phosphate, for example, a complex phosphate of aluminium containing one or more chemically bound molecules of water and/or one or more chemically bound oxygen-containing organic molecules, and at least one acidic anion other than phosphate.

16 Claims, No Drawings

REFRACTORY BINDER

This invention relates to a binder suitable for use in the binding of particles of a non-basic refractory aggregate and to refractory compositions containing the binder.

Refractory compositions comprising a non-basic aggregate, a calcium aluminate binder, and a dispersant for the binder are known and it is further known that the hot strengths of refractory products made from such refractory compositions are in many cases not as high as may be desired.

It has been proposed to improve the hot strengths of products made from such refractory compositions by including sodium polyphosphate in the compositions.

We have now found that the hot strengths of products made from refractory compositions comprising a non-basic aggregate, a calcium aluminate binder and a dispersant for the binder may in many cases be improved if the binder comprises a mixture of a calcium aluminate and a watersoluble aluminium phosphate.

The present invention provides a binder suitable for use in the binding of non-basic refractory aggregate and comprising a mixture of a calcium aluminate and a watersoluble aluminium phosphate.

Water soluble aluminium phosphates which may be used include aluminium acid phosphates, for example mono-aluminium acid phosphate $Al(H_2PO_4)_3$ and di-aluminium acid phosphates $Al_2(HPO_4)_3$. Mixtures of aluminium phosphates may be used if desired.

A preferred aluminium phosphate, on account of the properties of refractory products prepared therefrom, is a complex phosphate of aluminium containing one or more chemically bound molecules of water and/or one or more chemically bound oxygen-containing organic molecules, and at least one acidic anion other than phosphate. If desired, a mixture of such complex phosphates may be used or there may be used a mixture of one or more such complex phosphates with one or more other aluminium phosphates.

The calcium aluminate forming part of the binder of the present invention may be considered to have an empirical formula $x$ CaO. $y$ $Al_2O_3$ in which the proportion of $x:y$ may vary over a wide range. For example, $x:y$ may vary over the range 3:1 to 1:5, and preferably over the range 2:1 to 1:5. In general, in the calcium aluminate used in the binders of the present invention the molecular proportion of the $Al_2O_3$ will at least equal that of the CaO and most preferably will be in the range 1:1 to 1:3. Distinct calcium aluminate compounds which may be mentioned include those in which $x$ is 3 and $y$ is 1, $x$ is 5 and $y$ is 3, $x$ is 1 and $y$ is 1, and $x$ is 3 and $y$ is 5. A preferred calcium aluminate is that in which $x:y$ is substantially 1:2.5. The binder of the present invention may comprise a mixture of two or more calcium aluminates of differing compositions. The calcium aluminate may contain impurities, e.g. silica and iron-containing impurities.

The relative proportion of the calcium aluminate and the aluminum phosphate in the binder may vary over a wide range in order that products made from refractory compositions containing the binder may have improved hot strength.

We have found that given improvements in hot strengths of products made from refractory compositions may be obtained using a proportion of aluminium phosphate in the calcium aluminate/aluminium phosphate binder (expressed as a molar ratio of $P_2O_5$ (from the aluminium phosphate):CaO (from the calcium aluminate)) which is smaller than the proportion of sodium polyphosphate (expressed as a molar ratio of $P_2O_5$ (from the sodium polyphosphate):CaO (from the calcium aluminate)) in a calcium aluminate/sodium polyphosphate binder required to produce the same improvement in hot strength. The molar ratio of $P_2O_5$:CaO in the calcium aluminate/aluminium phosphate binder is preferably not greater than 0.7 and is suitably in the range 0.05:0.7. The most preferred range is 0.05:0.5.

The preferred complex aluminium phosphate forming part of the binder may be made by reacting aluminium or an aluminium compound with water or with an oxygen-containing organic molecule, for example with a compound ROH, where R is hydrogen and/or an organic group, and with phosphoric acid, a phosphoric acid ester or a compound capable of forming phosphoric acid or a phosphoric acid ester. The preparation is preferably carried out at a temperature between 0°C and 50°C in water or oxygen-containing organic compound as a diluent and the complex phosphate may be separated from the diluent, for example, by precipitation with a non-solvent for the complex phosphate, by freeze-drying, or by spray-drying.

The acidic anion other than phosphate in the complex aluminium phosphate may be an inorganic acid acid anion, for example, halide, e.g. chloride or bromide; an oxyacid anion, e.g. sulphate, nitrate or perchlorate; or an anion of an organic acid, e.g. formate, acetate or benzoate. The acid anion may be derived by using an appropriate aluminium compound in the preparation of the complex aluminium phosphate. For example, when the aluminium compound which is used is a halide, e.g. chloride, the complex aluminium phosphate produced will contain halide as the acid anion. Alternatively, or in addition, the acid anion may be derived by using the corresponding acid in the reaction, for example, by using hydrochloric acid, nitric acid or sulphuric acid, and of course it is necessary to use such an acid where aluminium or aluminium phosphate is used in the preparation of the complex aluminium phosphate.

Suitable oxygen-containing organic molecules include hydroxy compounds, esters, aldehydes and ketones; preferred oxygen-containing organic molecules are those which form co-ordination compounds with aluminium salts. Preferred hydroxy compounds are aliphatic alcohols, for example aliphatic alcohols containing 1 to 10 carbon atoms; it is especially preferred to use aliphatic alcohols containing from 1 to 4 carbon atoms, for example ethyl alcohol.

The ratio of the number of gram atoms of aluminium to the number of gram atoms of phosphorus in the complex phosphate may vary over a wide range, for example from 1:2 to 2:1, more especially 1:1 to 2:1, but is preferably substantially 1:1 that is, in the range of about 0.8:1 to 1.2:1, as complex phosphates having this ratio decompose at low temperatures directly to form aluminium orthophosphate having greater chemical stability and refractoriness than aluminium phosphates formed from complex phosphates with other ratios. The ratio of the number of gram atoms of aluminium to the number of gram atoms of other anion in the complex phosphates may vary over a wide range, e.g. 0.5:1 to 2:1, but is preferably substantially 1:1.

The complex aluminium phosphate may contain, for example from 1 to 5 molecules of water an/or organic oxygen-containing molecule. Suitable complex phosphates of aluminium are described in our British Pat. Specifications Nos. 1,322,722 and 1,322,724.

Examples of complex aluminium phosphates include:
a. that containing chlorine and ethyl alcohol and having the empirical formula $AlPClH_{25}C_8O_8$. The infra-red and X-ray characteristics of the compound are described in Example 1 of the aforesaid specification No. 1,322,722. It is designated aluminium chlorophosphate ethanolate, and for convenience is referred to as ACPE;
b. that containing chlorine and water and having the empirical formula $AlPClH_{11}O_9$. The infra-red and X-ray characteristics of the compound are described in Example 1 of the aforesaid specification No. 1,322,724. It is designated aluminium chlorophosphate hydrate, and for convenience is referred to as ACPH;
c. that containing bromine and ethyl alcohol and having the empirical formula $AlPBrH_{25}C_8O_8$. The infra-red and X-ray characteristics of the compound are described in Example 3 of the aforesaid specification No. 1,322,722. It is designated aluminium bromophosphate ethanolate, and for convenience is referred to as ABPE.

It is to be understood, however, that these designations in no way imply any particular molecular structures for the compounds.

In a further embodiment of the present invention there is provided a composition comprising a mixture of a binder as hereinbefore described and a particulate nonbasic refractory aggregate. The composition is essentially dry and the binder is suitably present in the composition in a proportion of from 1 to 40 percent by weight of the composition. Proportions of from 5 to 30 percent and 10 to 28 percent of binder by weight of the composition are more preferred.

The present invention also provides a refractory composition comprising a binder as herein before described, a particular non-basic refractory aggregate, and a diluent in which the aluminium phosphate in the binder is soluble. The most preferred diluent is water. The amount of diluent used should be such as to produce a refractory composition having a consistency suitable for the particular application for which it is to be used. Generally the refractory composition will have a paste-like consistency and the amount of diluent in the refractory composition will be in the range 0.5 to 25 percent by weight of the composition but is preferably in the range 2 to 15 percent and more preferably in the range 5 to 10 percent by weight of the composition.

Although the much preferred diluent for use in the refractory composition is water other diluents which may be used include polar organic diluents, for example, methyl alcohol, ethyl alcohol, isopropyl alcohol, butyl alcohol, ethylene glycol, monoethyl ether, or a mixture of two or more diluents. A mixture of diluents may be used, for example, a mixture of water with one or more of the aforementioned polar organic diluents.

The refractory composition may be made in a variety of ways. For example, it is most conveniently prepared by addition of the diluents, especially water, to the essentially dry composition hereinbefore described. Alternatively, the refractory composition may be made by mixing a solution of the aluminium phosphate in the diluent with a calcium aluminate and with the particulate non-basic refractory aggregate. For example, the solution of aluminium phosphate used may be a solution of the complex aluminium phosphate as hereinbefore described and may even be a solution of the complex phosphate as prepared or after suitable concentration.

Suitable non-basic refractory aggregates for use in the refractory compositions of the present invention include high alumina aggregates, for example, calcined bauxite, fused alumina and tabular alumina; titanium oxides; zirconium silicate, zirconia; aluminium silicates, e.g. sillimanite, andalusite, kyanite, mullite and molochite; porcelain and china clays; carbides, e.g. silicon and tungsten carbide; nitrides, e.g. silicon and boron nitride; boron; asbestos; ferric oxide; chromium oxide; chromite; mica; aluminium phosphate; carbon e.g. graphite; and mixtures thereof.

The refractory aggregate for use in the refractory compositions of the present invention may consist essentially of a non-basic refractory aggregate but we do not exclude the possibility of the refractory aggregate containing some basic aggregate in addition to non-basic aggregate.

The refractroy aggregate may be in any suitable form depending on the use to which the composition is to be put. Generally it is in the form of a powder but it may also be in the form of, for example, fibres, chips and flakes.

The particle size of refractory aggregate may be varied over a wide range depending on the intended use of the refractory compositions. For example, relatively coarse powders whose particle size falls substantially within the range of 0.35 to 1 0 mm may be used. Finer powders substantially the whole of which has a particle size of less than 0.05 mm may also be used. Mixtures of coarse and fine powders are preferred in some embodiments. For example, for moulds used in investment casting, it is preferred to use a refractory powder at least 50% by weight of which has a particlar size of less than 0.15 mm and more preferably less than 0.075 mm. On the other hand, the refractory aggregate may have a particle size of up to 2 cm or even greater.

The refractory compositions may be used for a wide range of purposes, including the production of shaped articles (especially by moulding) and also for purposes in which the hardening of the composition and its adhesion to its surroundings can be utilised, as for example as a coating composition, especially on metal substrates. The refractory composition may also be used as a ramming mix, a pressing mix, a gunning mix, or as a mortar, cement, or filler, for example for binding ceramics, but it is especially useful in high temperature applications, for example, in furnace walls and linings. The proportions of the components and the consistency of the refractory composition may be chosen to make the composition of optimum value for the use intended. The shaped articles which may be produced from the refractory compositions include bricks, for example, furnace bricks, and other shaped structures, e.g. rectangular and hexagonal-shaped blocks; moulds, especially casting moulds; and sheets and other monoliths, for example, monolithic linings for high temperature applications.

Refractory articles may be made from the refractory composition by heating the composition, for example, at a temperature in the range 80°C to 1200°C or even 1500°C. Suitably, the formed shape when in its 'green' state is first dried, e.g. at a temperature of from about 80°C to about 250°C before being transferred to a furnace for high temperature firing. The firing is carried out for a time sufficient to fully harden the composition.

If desired, the refractory compositions may be foamed to form lightweight solid shapes having a cellular structure. Thus the composition may also incorporate a blowing agent.

As blowing agent there may be used any of the conventional agents such as fluorocarbon propellents and other volatile organic compounds as well as inorganic substances such as sulphur hexafluoride, carbon dioxide, argon or nitrogen.

When the refractory compositions are used as coating compositions they may be applied to a substrate by conventional means, for example by dipping, spraying or brushing. The substrate may be in particular a metal, but may be any other desired substrate and in any form.

The invention is illustrated by the following Examples.

EXAMPLE 1

135 g of anhydrous aluminium chloride were added slowly to 300 ml of water and to the resulting solution there were added 110 g of 89% aqueous orthophosphoric acid. The resultant yellow solution was dehydrated in a co-current spray-drier having a spinning disc atomiser and a chamber at atmospheric pressure. Air inlet temperature was 140°C and air outlet temperature was 70°C. A yellow water-soluble powder was produced which had the following analysis:

|  | Al | Cl | $PO_4$ | $H_2O$ |
|---|---|---|---|---|
| % by weight | 11.4 | 17.4 | 39.3 | 30.0 |
| proportion | 1.00 | 1.10 | 1.12 | 4.0 |

The white powder will hereinafter be referred to as ACPH. 89.9 g of −48 tabular alumina, 7.5 g of powdered calcium aluminate ($CaO:Al_2O_3$ 1:2.5) and 2.6 g of ACPH were thoroughly mixed and water was then added slowly and the mixture stirred until a paste-like consistency had been obtained. 12ml of water were added to the mixture. In the calcium aluminate/ACPH binder the molar ratio of $P_2O_5$:CaO was 0.25.

The paste was then cast into four moulds each mould having a cavity of dimensions 4 in × ½ in, the paste was allowed to set by standing for 6 hours, and the resultant 4 in × ½ in × ½ in test pieces were then removed from the moulds and heated at 110°C for 16 hours.

The test pieces were then heated at 1400°C for 2 hours and the hot modulus of rupture of the test pieces was measured. The hot modulus of rupture at 1400°C was 84 lb/sq in$^{-1}$.

By way of comparison the above procedure was repeated except that the ACPH was replaced by 1.29 g of sodium polyphosphate and 91.2 g of −48 tabular alumina, 7.5 g of calcium aluminate and 11.5 ml of water were used. The molar ratio of $P_2O_5$:CaO in the calcium aluminate/sodium polyphosphate binder was 0.25. The hot modulus of rupture of the test pieces produced was 54 lb/sq in$^{-1}$ at 1400°C.

EXAMPLE 2

The procedure described in Example 1 was followed except that 87.3 g of −48 tabular alumina, 7.5 g of calcium aluminate, 5.17 g of ACPH and 10 ml of water were used. The molar ratio of $P_2O_5$:CaO was 0.5.

The hot modulus of rupture of the test pieces produced was 57 lb/sq in$^{-1}$ at 1400°C.

By way of comparison the procedure of the comparative experiment of Example 1 was followed except that 89.9 g of −48 tabular alumina, 7.5 g of calcium aluminate and 2.58 g of sodium polyphosphate were used. The molar ratio of $P_2O_5$:CaO was 0.5 and the hot modulus of rupture of the test pieces was 53 lb/sq in$^{-1}$ at 1400°C.

EXAMPLE 3

The procedure of Example 1 was followed in five separate experiments, A to E, to produce paste-like mixtures from 89.9 g of −48 tabular alumina 7.5 g of calcium aluminate and respectively 1.03 g, 2.6 g, 5.2 g, 10.2 g and 15.4 g of ACPH, and in each case sufficient water to achieve a pastelike consistency.

The pastes were then cast into separate moulds, were allowed to dry, and were cured following the procedure described in Example 1. The hot modulus of rupture of each of the test pieces was measured at 1400°C and the results are presented in the following table:

| Experiment | Molar ratio $P_2O_5$:CaO in calcium aluminate/ACPH binder | Hot modulus of rupture at 1400°C lb/sq in | Standard deviation lb/sq in |
|---|---|---|---|
| A | 0.10 | 119 | 4 |
| B | 0.24 | 142 | 37 |
| C | 0.48 | 122 | 16 |
| D | 0.95 | 43 | 14 |
| E | 1.43 | 39 | 5 |

By way of comparison the above procedure was repeated in five separate experiments, F to J, except that 91.2 g of −48 tabular alumina was used and in place of the ACPH there was used 1.03 g, 1.29 g, 2.58 g, 5.17 g and 7.75 g of sodium polyphosphate.

The hot modulus of rupture of each of the test pieces which was produced was measured at 1400°C and the results are presented in the following table:

| Experiment | Molar ratio $P_2O_5$:CaO in calcium aluminate/ sodium polyphosphate binder | Hot modulus of rupture at 1400°C lb/sq in | Standard deviation lb/sq in |
|---|---|---|---|
| F | 0.20 | 60 | 18 |
| G | 0.25 | 54 | 5 |
| H | 0.50 | 53 | 3 |
| I | 1.00 | 66 | 11 |
| J | 1.50 | 0 | — |

By way of further comparison the hot modulus of rupture at 1400°C of a test piece produced from a pastelike mixture containing water, 91.2 g of −48 tabular alumina and 7.5 g of calcium aluminate was 67 lb/sq in (standard deviation 7 lb/sq in).

What we claim is:

1. A binder suitable for use in the binding of non-basic refractory aggregate and comprising a mixture of a calcium aluminate and a water-soluble aluminium phosphate, in which the calcium aluminate has the empirical formula x CaO. y $Al_2O_3$, where x:y is in the range 3:1 to 1:5 and wherein the molar ratio of $P_2O_5$ in the aluminium phosphate to CaO in the calcium aluminate is in the range 0.05:0.7.

2. A binder as claimed in claim 1 in which the water-soluble aluminium phosphate is a complex phosphate of aluminium containing one or more chemically bound molecules of water and/or one or more chemically bound oxygen-containing organic molecules, and at least one acidic anion other than phosphate.

3. A binder as claimed in claim 1 in which x:y is in the range 2:1 to 1:5.

4. A binder as claimed in claim 3 in which x:y is in the range 1:1 to 1:3.

5. A binder as claimed in claim 4 in which x:y is substantially 1:2.5.

6. A binder as claimed in claim 2 in which the complex phosphate of aluminium contains at least one chemically-bound molecule of water and in which the atomic ratio of aluminium:phosphorus is in the range 0.3:1 to 1.2:1.

7. A binder as claimed in claim 6 in which in the complex aluminium phosphate the atomic ratio of aluminium: phosphorus is substantially 1:1.

8. A binder as claimed in claim 7 in which the complex aluminium phosphate has the empirical formula $AlPClH_{11}O_9$.

9. A binder as claimed in claim 1 in which the molar ratio of $P_2O_5$:CaO is in the range 0.05 to 0.5.

10. A composition comprising a binder as claimed in claim 1 and a particulate non-basic refractory aggregate.

11. A composition as claimed in claim 10 in which the binder is present in a proportion of from 1 to 40 percent by weight of the composition.

12. A composition as claimed in claim 11 in which the binder is present in a proportion of 5 to 30 percent by weight of the composition.

13. A composition as claimed in claim 10 in which the refractory aggregate comprises tabular alumina.

14. A refractory composition comprising a composition as claimed in claim 10 and a diluent in which the aluminium phosphate in the binder is soluble.

15. A refractory composition as claimed in claim 14 in which the diluent is present in a proportion of 0.5 to 25 percent by weight of the refractory composition.

16. A refractory composition as claimed in claim 14 in which the diluent is water.

* * * * *